(12) United States Patent
Mossberg et al.

(10) Patent No.: US 7,203,401 B2
(45) Date of Patent: Apr. 10, 2007

(54) MULTIPLE WAVELENGTH OPTICAL SOURCE

(75) Inventors: Thomas W. Mossberg, Eugene, OR (US); Dmitri Iazikov, Springfield, OR (US); Chistoph M. Greiner, Eugene, OR (US)

(73) Assignee: LightSmyth Technologies Inc, Eugene, OR (US)

( * ) Notice: Subject to any disclaimer, the term of this patent is extended or adjusted under 35 U.S.C. 154(b) by 0 days.

(21) Appl. No.: 11/383,494

(22) Filed: May 16, 2006

(65) Prior Publication Data

US 2006/0193553 A1 Aug. 31, 2006

Related U.S. Application Data

(63) Continuation of application No. 10/923,455, filed on Aug. 21, 2004, now Pat. No. 7,054,517, and a continuation-in-part of application No. 09/843,597, filed on Apr. 26, 2001, now Pat. No. 6,965,464, which is a continuation-in-part of application No. 09/811,081, filed on Mar. 16, 2001, now Pat. No. 6,879,441, application No. 11/383,494, which is a continuation-in-part of application No. 10/653,876, filed on Sep. 2, 2003, now Pat. No. 6,829,417, which is a continuation-in-part of application No. 09/811,081, filed on Mar. 16, 2001, now Pat. No. 6,879,441, which is a continuation-in-part of application No. 10/229,444, filed on Aug. 27, 2002, now Pat. No. 6,678,429.

(60) Provisional application No. 60/497,410, filed on Aug. 21, 2003, provisional application No. 60/370,182, filed on Apr. 4, 2002, provisional application No. 60/315,302, filed on Aug. 27, 2001, provisional application No. 60/247,231, filed on Nov. 10, 2000, provisional application No. 60/235,330, filed on Sep. 26, 2000, provisional application No. 60/199,790, filed on Apr. 26, 2000, provisional application No. 60/190,126, filed on Mar. 16, 2000.

(51) Int. Cl.
*G02B 6/34* (2006.01)

(52) U.S. Cl. .............................. 385/37; 385/24; 372/20; 372/102

(58) Field of Classification Search .................. 385/10, 385/14, 24, 37, 129, 132; 372/18, 20, 96, 372/102; 398/84
See application file for complete search history.

(56) References Cited

U.S. PATENT DOCUMENTS 5,274,657 A * 12/1993 Hori et al. ............. 372/50.123
2006/0256831 A1 * 11/2006 Volodin et al. ............. 372/102

* cited by examiner

*Primary Examiner*—Hemang Sanghavi
(74) *Attorney, Agent, or Firm*—David S. Alavi

(57) ABSTRACT

A planar optical waveguide is formed having sets of locking diffractive elements and means for routing optical signals. Lasers are positioned to launch signals into the planar waveguide that are successively incident on elements of the locking diffractive element sets, which route fractions of the signals back to the lasers as locking feedback signals. The routing means route between lasers and output port(s) portions of those fractions of signals transmitted by locking diffractive element sets. Locking diffractive element sets may be formed in channel waveguides formed in the planar waveguide, or in slab waveguide region(s) of the planar waveguide. Multiple routing means may comprise routing diffractive element sets formed in a slab waveguide region of the planar waveguide, or may comprise an arrayed waveguide grating formed in the planar waveguide. The apparatus may comprise a multiple-wavelength optical source.

31 Claims, 9 Drawing Sheets ns. No. 10/653,876
entitled "Amplitude and phase control in distributed optical
structures" filed Sep. 2, 2003 in the names of Thomas W.
Mossberg and Christoph M. Greiner (now U.S. Pat. No.
6,829,417);

U.S. non-provisional application Ser. No. 10/740,194
entitled "Optical multiplexing device" filed Dec. 17, 2003 in
the names of Dmitri Iazikov, Thomas W. Mossberg, and
Christoph M. Greiner;

U.S. non-provisional application Ser. No. 10/794,634
entitled "Temperature-compensated planar waveguide optical apparatus" filed Mar. 5, 2004 in the names of Dmitri
Iazikov, Thomas W. Mossberg, and Christoph M. Greiner
(now U.S. Pat. No. 6,985,656);

U.S. non-provisional application Ser. No. 10/798,089
entitled "Optical structures distributed among multiple optical waveguides" filed Mar. 10, 2004 in the names of Christoph M. Greiner, Thomas W. Mossberg, and Dmitri Iazikov
(now U.S. Pat. No. 6,823,115);

U.S. non-provisional application Ser. No. 10/842,790
entitled "Multimode planar waveguide spectral filter" filed
May 11, 2004 in the names of Thomas W. Mossberg,
Christoph M. Greiner, and Dmitri Iazikov (now U.S. Pat.
No. 6,987,911);

U.S. non-provisional application Ser. No. 10/857,987
entitled "Optical waveform recognition and/or generation
and optical switching" filed May 29, 2004 in the names of
Lawrence D. Brice, Christoph M. Greiner, Thomas W.
Mossberg, and Dmitri Iazikov (now U.S. Pat. No. 6,990,
276); and U.S. non-provisional application Ser. No. 10/898,527
entitled "Distributed optical structures with improved diffraction efficiency and/or improves optical coupling" filed
Jul. 22, 2004 in the names of Dmitri Iazikov, Christoph M.
Greiner, and Thomas W. Mossberg.

Each of these applications and patents is hereby incorporated by reference as if fully set forth herein.

MULTIPLE WAVELENGTH OPTICAL SOURCE

RELATED APPLICATIONS

This application is a continuation of U.S. non-provisional application Ser. No. 10/923,455 filed Aug. 21, 2004 (now U.S. Pat. No. 7,054,517), which in turn claims benefit of U.S. provisional App. No. 60/497,410 filed Aug. 21, 2003, each of said provisional and non-provisional applications being hereby incorporated by reference as if fully set forth herein.

U.S. application Ser. No. 10/923,455 is also a continuation-in-part of U.S. non-provisional application Ser. No. 10/653,876 filed Sep. 2, 2003 (now U.S. Pat. No. 6,829,417), which is in turn a continuation-in-part of U.S. non-provisional application Ser. No. 10/229,444 filed Aug. 27, 2002 (now U.S. Pat. No. 6,678,429), each of said non-provisional applications being hereby incorporated by reference as if fully set forth herein. U.S. application Ser. No. 10/229,444 in turn claims benefit of U.S. provisional App. No. 60/315,302 filed Aug. 27, 2001 and U.S. provisional App. No. 60/370,182 filed Apr. 4, 2002, each of said provisional applications being hereby incorporated by reference as if fully set forth herein.

U.S. application Ser. No. 10/923,455 is also a continuation-in-part of U.S. non-provisional application Ser. No. 09/811,081 filed Mar. 16, 2001 (now U.S. Pat. No. 6,879,441), and a continuation-in-part of U.S. non-provisional application Ser. No. 09/843,597 filed Apr. 26, 2001 (now U.S. Pat. No. 6,965,464), application Ser. No. 09/843,597 in turn being a continuation-in-part of said application Ser. No. 09/811,081. Said application Ser. No. 09/811,081 in turn claims benefit of: 1) U.S. provisional App. No. 60/190,126 filed Mar. 16, 2000; 2) U.S. provisional App. No. 60/199,790 filed Apr. 26, 2000; 3) U.S. provisional App. No. 60/235,330 filed Sep. 26, 2000; and 4) U.S. provisional App. No. 60/247,231 filed Nov. 10, 2000. Each of said provisional and non-provisional applications is hereby incorporated by reference as if fully set forth herein.

BACKGROUND

The field of the present invention relates to optical devices incorporating distributed optical structures. In particular, a multiple wavelength optical source incorporating at least one distributed optical structure is disclosed herein.

Distributed optical structures employed in the multiple wavelength optical sources disclosed or claims herein may be implemented with a variety of adaptations, such as those described in:

U.S. non-provisional application Ser. No. 09/811,081 entitled "Holographic spectral filter" filed Mar. 16, 2001 in the name of Thomas W. Mossberg (now U.S. Pat. No. 6,879,441);

U.S. non-provisional application Ser. No. 09/843,597 entitled "Optical processor" filed Apr. 26, 2001 (now U.S. Pat. No. 6,965,464);

U.S. non-provisional application Ser. No. 10/229,444 entitled "Amplitude and phase control in distributed optical structures" filed Aug. 27, 2002 in the names of Thomas W. Mossberg and Christoph M. Greiner (now U.S. Pat. No. 6,678,429);

U.S. non-provisional application Ser. No. 10/602,327 entitled "Holographic spectral filter" filed Jun. 23, 2003 in the name of Thomas W. Mossberg (now U.S. Pat. No. 6,859,318);

SUMMARY

A method for forming an optical apparatus comprises: forming a planar optical waveguide; forming at least one set of locking diffractive elements in or on the planar optical waveguide; forming means for routing an optical signal corresponding to at least one said set of locking diffractive elements; and positioning a laser corresponding to at least one said set of locking diffractive elements. The planar optical waveguide substantially confines in at least one transverse spatial dimension optical signals propagating therein. Each laser is positioned so as to launch a corresponding laser optical signal into the planar optical waveguide so that the corresponding laser optical signal is successively incident on the diffractive elements of the corresponding locking diffractive element set. Each locking diffractive element set routes within the planar optical waveguide a fraction of the corresponding laser optical signal back to the corresponding laser, with a corresponding locking transfer function, as a corresponding locking optical feedback signal, thereby substantially restricting the corresponding laser optical signal to a corresponding laser operating wavelength range determined at least in part by the corresponding locking transfer function of the corresponding locking diffractive element set. Each corresponding routing means routes within the planar optical waveguide, between the corresponding laser and a corresponding output optical port with a corresponding routing transfer function, at least a portion of that fraction of the corresponding laser optical signal that is transmitted by the corresponding locking diffractive element set. The optical apparatus may comprise multiple lasers, multiple corresponding locking diffractive element sets, and multiple corresponding routing means, thereby comprising a multiple-wavelength optical source.

The locking diffractive element sets may be formed in corresponding channel waveguides formed in the planar optical waveguide, or may be formed in one or more slab waveguide regions of the planar optical waveguide. The multiple corresponding routing means may comprise corresponding routing diffractive element sets formed in a slab waveguide region of the planar optical waveguide, or may comprise an arrayed waveguide grating formed in the planar optical waveguide. The multiple lasers may be individually assembled with the planar waveguide, may be assembled with the planar waveguide as an integrated laser array, or may be integrated directly into the planar waveguide. The corresponding laser output signals may be routed to a single output port or to multiple output ports.

Objects and advantages pertaining to diffractive element sets, planar optical waveguides, or multiple-wavelength optical sources may become apparent upon referring to the disclosed embodiments as illustrated in the drawings or disclosed in the following written description or appended claims.

Figure 1:
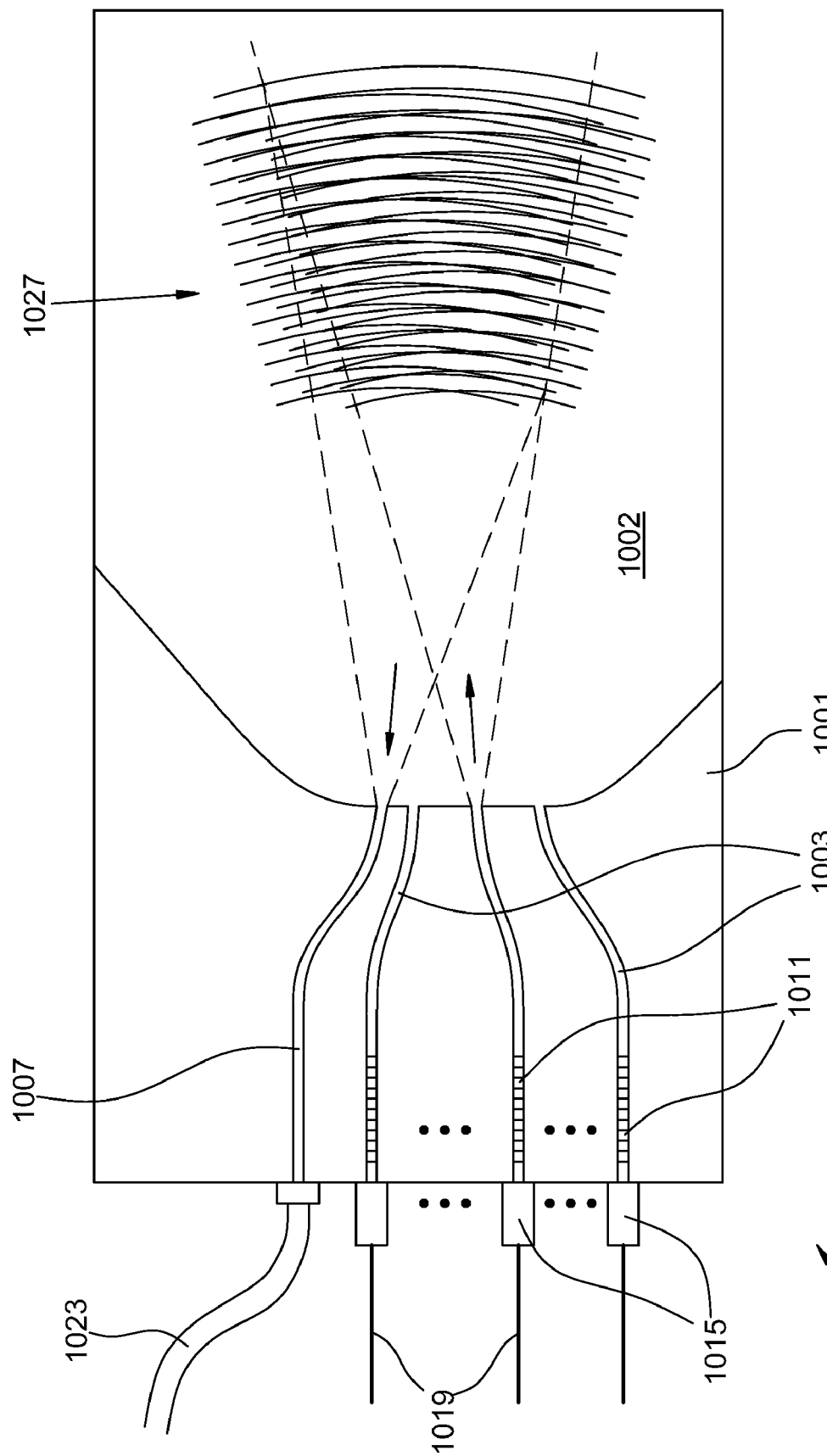
FIG. 1 illustrates schematically a planar waveguide with multiple locking diffractive element sets and multiple routing diffractive element sets, and multiple lasers.

The embodiments shown in the Figures are exemplary, and should not be construed as limiting the scope of the present disclosure and/or appended claims.

DETAILED DESCRIPTION OF EMBODIMENTS

An optical apparatus according to the present disclosure comprises a planar optical waveguide having at least one set of diffractive elements. The planar optical waveguide substantially confines in at least one transverse dimension optical signals propagating therein, and is generally formed on or from a substantially planar substrate of some sort. The confined optical signals typically propagate as transverse optical modes supported or guided by the planar optical waveguide. These optical modes are particular solutions of the electromagnetic field equations in the space occupied by the waveguide. The planar optical waveguide may comprise a slab waveguide, substantially confining in one transverse dimension an optical signal propagating in two dimensions therein, or may comprise a channel waveguide, substantially confining in two transverse dimension an optical signal propagating therein. It should be noted that the term "planar waveguide" is not used consistently in the literature; for the purposes of the present disclosure and/or appended claims, the terms "planar optical waveguide" and "planar waveguide" are intended to encompass both slab and channel optical waveguides.

The planar waveguide typically comprises a core surrounded by lower-index cladding (often referred to as upper and lower cladding, or first and second cladding; these may or may not comprise the same materials). The core is fabricated using one or more dielectric, semiconductor, or other materials substantially transparent over a desired operating wavelength range. In some instances one or both claddings may be vacuum, air, or other ambient atmosphere. More typically, one or both claddings comprise material layers, with the cladding refractive indices $n_1$ and $n_2$ typically being smaller than the core refractive index $n_{core}$. (In some instances in which short optical paths are employed and some degree of optical loss can be tolerated, the cladding indices might be larger than the core index while still enabling the planar waveguide to support guided, albeit lossy, optical modes.) A planar waveguide may support one or more transverse modes, depending on the dimensions and refractive indices of the core and cladding. A wide range of material types may be employed for fabricating a planar waveguide, including but not limited to glasses, polymers, plastics, semiconductors, combinations thereof, or functional equivalents thereof. The planar waveguide may be secured to a substrate, for facilitating manufacture, for mechanical support, or for other reasons. A planar waveguide typically supports or guides one or more optical modes characterized by their respective amplitude variations along the confined dimension.

The set of diffractive elements of the planar optical waveguide may also be referred to as: a set of holographic elements; a volume hologram; a distributed reflective element, distributed reflector, or distributed Bragg reflector (DBR); a Bragg reflective grating (BRG); a holographic Bragg reflector (HBR); a directional photonic-bandgap structure; a mode-selective photonic crystal; or other equivalent terms of art. Each diffractive element of the set diffracts, reflects, scatters, or otherwise redirects a portion of an incident optical signal (said process hereinafter simply referred to as diffraction). Each diffractive element of the set typically comprises some suitable alteration of the planar waveguide (ridge, groove, index modulation, density modulation, and so on), and is spatially defined by a virtual one- or two-dimensional curvilinear diffractive element contour. The curvilinear shape of the contour may be configured to impart desired spatial characteristics onto the diffracted portion of the optical signal. The curvilinear contours may be smoothly curved, or may be approximated by multiple short, substantially linear contour segments (in some instances dictated by fabrication constraints). Implementation of a diffractive element with respect to its virtual contour may be achieved in a variety of ways, including those disclosed in the references cited hereinabove. Each curvilinear diffractive element is shaped to direct or route its diffracted portion of the optical signal between input and output optical ports. The relative spatial arrangement (e.g. longitudinal spacing) of the diffractive elements of the set, and the relative amplitude diffracted from each diffractive element of the set, yield desired spectral or temporal characteristics for the overall diffracted optical signal routed between the input and output optical ports. It should be noted that optical ports (input or output) may be defined structurally (for example, by an aperture, waveguide, fiber, lens, laser or other optical source, or other optical component) or functionally (i.e., by a spatial location, size, convergence, divergence, collimation, or propagation direction), or both structurally and functionally. In some instances a pair of corresponding input and output ports may comprise the same optical port (i.e., the diffracted portion of the optical signal is retro-reflected). In some instances the input and output ports may be interchanged (i.e., the action of the diffractive element set is symmetric). For a single-mode planar waveguide, such a set of diffractive elements may be arranged to yield an arbitrary spectral/temporal transfer function (i.e., diffracted amplitude and phase as functions of wavelength). In a multimode planar waveguide, modal dispersion or mode-to-mode coupling of diffracted portions of the optical signal may limit the range of spectral/temporal transfer functions that may be implemented.

The curvilinear diffractive elements of the set (or equivalently, their corresponding contours) are spatially arranged with respect to one another so that the corresponding portions of the optical signal diffracted by each element interfere with one another at the output optical port, so as to impart desired spectral or temporal characteristics onto the portion of the optical signal collectively diffracted from the set of diffractive elements and routed between the input and output optical ports. The diffractive elements in the set are arranged so that an input optical signal, entering the planar waveguide through an input optical port, is successively incident on diffractive elements of the set. For the purposes of the present disclosure or appended claims, "successively incident" shall denote a situation wherein a wavevector at a given point on the wavefront of an optical signal (i.e., a wavefront-normal vector) traces a path (i.e., a "ray path") through the diffractive element set that successively intersects the virtual contours of diffractive elements of the set. Such wavevectors at different points on the wavefront may intersect a given diffractive element virtual contour at the same time or at differing times; in either case the optical signal is considered "successively incident" on the diffractive elements. A fraction of the incident amplitude is diffracted by a diffractive element and the remainder is transmitted and incident on another diffractive element, and so on successively through the set of diffractive elements. The diffractive elements may therefore be regarded as spaced substantially longitudinally along the propagation direction of the incident optical signal, and a given spatial portion of the wavefront of such a successively incident optical signal therefore interacts with many diffractive elements of the set. (In contrast, the diffractive elements of a thin diffraction grating, e.g. the grating lines of a surface grating, may be regarded as spaced substantially transversely across the wavefront of a normally incident optical signal, and a given spatial portion of the wavefront of such a signal therefore interacts with only one or at most a few adjacent diffractive elements).

The set of diffractive elements provides dual functionality, spatially routing an optical signal between an input optical port and an output optical port, while at the same time acting to impart a spectral/temporal transfer function onto the input optical signal to yield an output optical signal. The curvilinear diffractive elements may be designed (by computer generation, for example) so as to provide optimal routing, imaging, or focusing of the optical signal between an input optical port and a desired output optical port, thus reducing or minimizing insertion loss. Simple curvilinear diffractive elements (segments of circles, ellipses, parabolas, hyperbolas, and so forth), if not optimal, may be employed as approximations of fully optimized contours. Numerous short, substantially linear segments may be employed to approximate a smoothly curved contour. A wide range of fabrication techniques may be employed for forming the diffractive element set, and any suitable technique(s) may be employed while remaining within the scope of the present disclosure and/or appended claims. Particular attention is called to design and fabrication techniques disclosed in the references cited hereinabove. The following are exemplary only, and are not intended to be exhaustive.

Diffractive elements may be formed lithographically on the surface of a planar optical waveguide, or at one or both interfaces between core and cladding of a planar optical waveguide. Diffractive contours may be formed lithographically in the interior of the core layer or a cladding layer of the planar optical waveguide using one or more spatial lithography steps performed after an initial deposition of layer material. Diffractive elements may be formed in the core or cladding layers by projecting ultraviolet light or other suitable radiation through an amplitude or phase mask so as to create an interference pattern within the planar waveguide (fabricated at least in part with suitably sensitive material) whose fringe contours match the desired diffractive element contours. Alteration of the refractive index by exposure to ultraviolet or other radiation results in index-modulated diffractive elements. The mask may be zeroth-order-suppressed according to methods known in the art, including the arts associated with fabrication of fiber Bragg gratings. The amplitude or phase mask may be produced lithographically via laser writer or e-beam, it may be interferometrically formed, or it may be formed by any other suitable technique. In instances where resolution is insufficient to produce a mask having required feature sizes, a larger scale mask may be produced and reduced to needed dimensions via photoreduction lithography, as in a stepper, to produce a mask at the needed scale. Diffractive elements may be formed by molding, stamping, impressing, embossing, or other mechanical processes. A phase mask may be stamped onto the core or cladding surface followed by optical exposure to create diffractive elements throughout the core and or cladding region. The optical or UV source used to write the diffractive elements in this case should have a coherence length comparable or longer than the distance from the stamped phase mask to the bottom of the core region. Stamping of the phase mask directly on the device may simplify alignment of diffractive elements with ports or other device components, especially when those components may be formed in the same or another stamping process. Many approaches to the creation of refractive index modulations or gratings are known in the art and may be employed in the fabrication of diffractive element sets.

Irradiation-produced refractive index modulations or variations for forming diffractive elements will optimally fall in a range between about $10^{-4}$ and about $10^{-1}$; however, refractive index modulations or variations outside this range may be employed as well. Refractive index modulations or variations may be introduced by light of any wavelength (including ultraviolet light) that produces the desired refractive index changes, provided only that the photosensitive material employed is suitably stable in the presence of light in the desired operating wavelength range of the optical device. Exposure of a complete set of diffractive elements to substantially spatially uniform, refractive-index-changing light may be employed to tune the operative wavelength range of the diffractive element set. Exposure of the diffractive element set to spatially non-uniform refractive-index changing light may be employed to chirp or otherwise wavelength-modulate the diffractive element set (described further hereinbelow). The sensitivity of planar waveguide materials to irradiation produced refractive index modulations may be increased using hydrogen-loading, flame-brushing, boron or other chemical doping, or other method known in the art, for example in the context of making fiber Bragg gratings.

The curvilinear shape of the diffractive element contours may be determined by a variety of standard optical imaging system design tools. Essentially, each diffractive element contour may be optimized to image the input port onto the output port in a phase coherent manner. Inputs to the design are the detailed structure of the input and output optical ports and their locations. Standard ray tracing approaches to optical element design may provide a diffractive contour at each optical distance into the planar waveguide that will provide an optimal imaging of the input signal at the input port onto the optimal output signal at the output port. Simple curves may be employed as approximations of the fully optimized contours. Diffractive element virtual contours may be spaced by an optical path difference (as described above) that provides for the field image of successive diffractive contours to be substantially in phase at a desired wavelength. If the overall response of the diffractive element set is to be apodized with amplitude or phase modulation (to yield a desired spectral/temporal transfer function), the optical spacing of successive diffractive element contours may be varied in a controlled manner to provide required phase differences between diffracted components at the output port, or the diffractive strength of the elements may be individually controlled (as disclosed in the references cited hereinabove).

An alternative approach to designing the diffractive element contours for a diffractive element set is to calculate interference patterns between numerically simulated fields at a desired wavelength and with specified temporal waveforms entering the input port and exiting the output port. If a spectral transfer function is specified in a design, a corresponding temporal waveform may be obtained by Fourier transform. In forming or writing a summed pattern for the diffractive element set, suitable discretization is applied as needed for any lithographic or UV exposure approach that is utilized for fabrication. The holographic structure may be designed by interference of computer-generated beams having the desired computer-generated temporal waveforms, with the resulting calculated arrangement of diffractive elements implemented by lithography or other suitable spatially-selective fabrication techniques. For example, interference between a delta-function-like pulse and a desired reference optical waveform (or its time-reverse) may be calculated, and the resulting interference pattern used to fabricate a diffractive element set that acts to either recognize or generate the desired reference optical waveform.

In an alternative method for making the diffractive element structure, the core consists of a material of appropriate index that is also photosensitive at the wavelength of the desired operational signal beams. As in traditional holography, the input and output recording beams (same wavelength as operational signal beams of the envisioned device) are overlapped in the core and the interference pattern between them is recorded. Subsequently the core material is developed and, if necessary, a cladding may be deposited or attached by other means. A specified spectral transfer function may be generated by imparting spectrally sweeping the desired amplitude and phase variations on the recording beams, or the recording beams may be pulsed with temporal waveforms having the desired Fourier spectrum.

The phrase "operationally acceptable" appears herein describing levels of various performance parameters of planar waveguides and diffractive element sets thereof. Such parameters may include optical coupling coefficient (equivalently, optical coupling efficiency), diffraction efficiency, undesirable optical mode coupling, optical loss, and so on. An operationally acceptable level may be determined by any relevant set or subset of applicable constraints or requirements arising from the performance, fabrication, device yield, assembly, testing, availability, cost, supply, demand, or other factors surrounding the manufacture, deployment, or use of a particular assembled optical device. Such "operationally acceptable" levels of such parameters may therefor vary within a given class of devices depending on such constraints or requirements. For example, a lower optical coupling efficiency may be an acceptable trade-off for achieving lower device fabrication costs in some instances, while higher optical coupling may be required in other instances in spite of higher fabrication costs. In another example, higher optical loss (due to scattering, absorption, undesirable optical coupling, and so on) may be an acceptable trade-off for achieving lower device fabrication cost or smaller device size in some instances, while lower optical loss may be required in other instances in spite of higher fabrication costs and/or larger device size. Many other examples of such trade-offs may be imagined. Optical devices and fabrication methods therefor as disclosed herein, and equivalents thereof, may therefore be implemented within tolerances of varying precision depending on such "operationally acceptable" constraints or requirements. Phrases such as "substantially adiabatic", "substantially spatial-mode-matched", "so as to substantially avoid undesirable optical coupling", and so on as used herein shall be construed in light of this notion of "operationally acceptable" performance.

Figure 2:
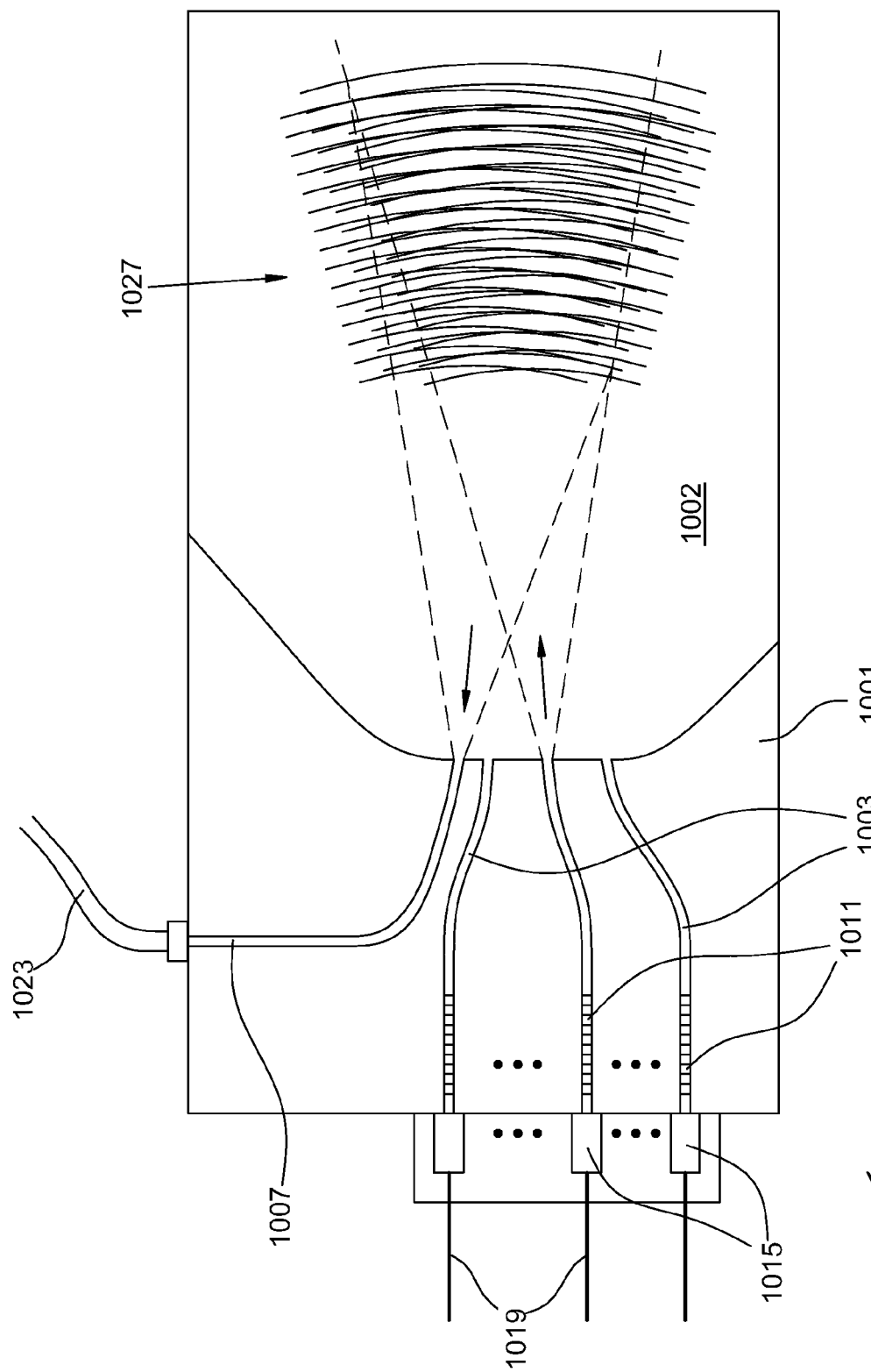
FIG. 2 illustrates schematically a planar waveguide with multiple locking diffractive element sets and multiple routing diffractive element sets, and multiple lasers.
Figure 3:
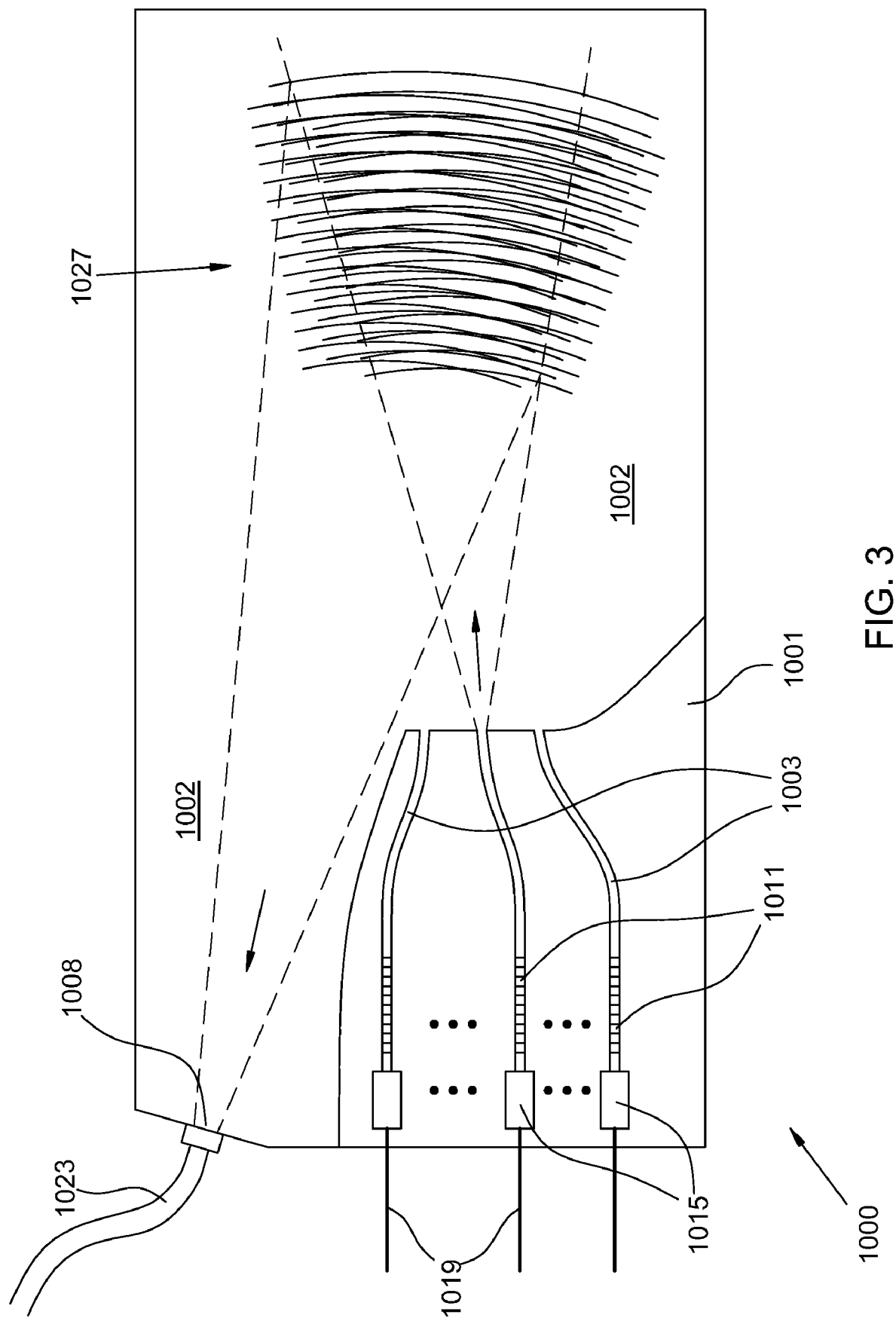
FIG. 3 illustrates schematically a planar waveguide with multiple locking diffractive element sets and multiple routing diffractive element sets, and multiple lasers.

Schematic plan views of exemplary embodiments of multiple-wavelength optical sources 1000 are shown in FIGS. 1–3. Multiple channel optical waveguide cores 1003 are formed in a region of planar waveguide 1001. Each channel waveguide core 1003 is positioned to receive a corresponding optical signal from a corresponding laser 1015. In FIG. 1, lasers 1015 comprise a set of individual lasers each independently assembled with the planar waveguide 1001. In FIG. 2, lasers 1015 comprise an integrated laser array that is assembled with the planar waveguide 1001. In FIG. 3, lasers 1015 are integrally formed on the planar waveguide 1001. Drive current or electronic control signals may be delivered to lasers 1015 via electrical conductors 1019. Each corresponding channel waveguide includes a set of locking diffractive elements 1011. Each laser optical signal launched along the corresponding channel waveguide core 1003 is successively incident on the diffractive elements of the corresponding locking diffractive element set 1011. The locking diffractive element sets 1011 each route along the corresponding channel waveguide core 1003 a fraction of the laser optical signal launched by the corresponding laser 1015 into the channel waveguide. The routed fraction of the optical signal is directed back to the laser to serve as a locking optical feedback signal. Each locking diffractive element set 1011 imparts onto the diffracted fraction of the optical signal a corresponding locking transfer function, which determines at least in part the operating wavelength range of the corresponding laser 1015. The spectral characteristics of the locking transfer function are independent of the operating current or other operating parameters of the laser, and the resulting optical feedback tends to substantially restrict the laser optical signal to a selected operating wavelength range in spite of variations in drive current or other laser operating parameters.

The lasers 1015 may typically comprise semiconductor devices, wherein injection of drive current results in optical gain. The laser optical signals may be modulated by modulation of the laser drive currents. The laser may include two reflectors (e.g. opposing facets of a semiconductor laser chip) and thereby form a resonant optical cavity for supporting laser oscillation. In this instance the combination of the laser 1015 with the locking diffractive element set 1011 in the channel waveguide results in an external-cavity feedback laser, wherein a portion of the laser output from the laser oscillator is re-injected back through the output facet to stabilize the laser within the wavelength range determined by the locking diffractive element set. In this instance, compensation (active or passive) may be required so that longitudinal modes of the laser resonant cavity and the external cavity substantially coincide; otherwise, the laser output power or laser wavelength may fluctuate to an unacceptable degree as the respective longitudinal mode frequencies drift relative to one another. Alternatively, reflectivity of the front laser facet may be suppressed (by a suitable anti-reflection coating, for example, thereby diminishing or suppressing laser oscillation supported only within the laser chip), and the locking diffractive element set may serve as a laser resonator mirror. In this instance the laser 1015 and the channel waveguide with locking diffractive element sets 1011 together comprise a hybrid resonant optical cavity for supporting laser oscillation within the wavelength range determined by the locking diffractive element set. Both of these scenarios shall fall within the scope of the present disclosure or appended claims.

Figure 4A:
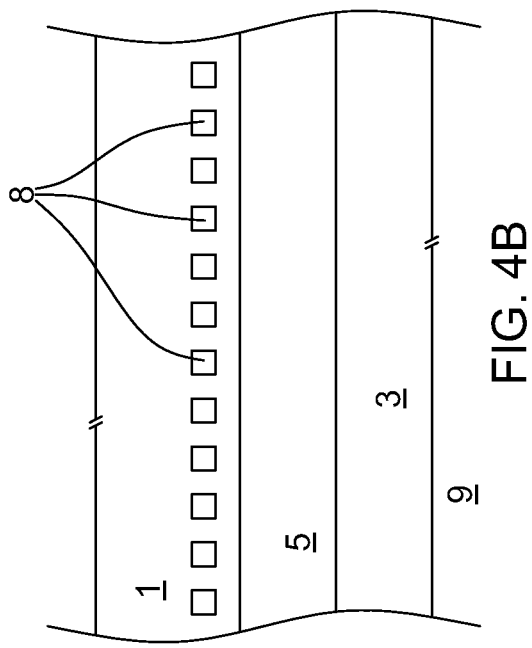
FIGS. 4A–4D are schematic cross-sections of diffractive elements in a planar waveguide.
Figure 4B:
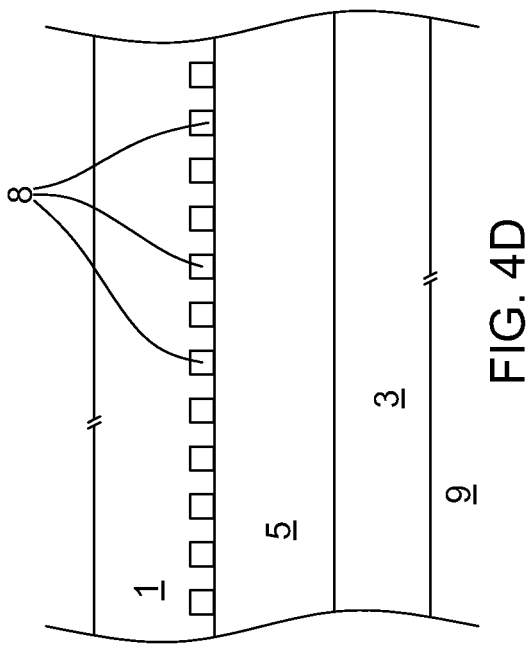
Figure 4C:
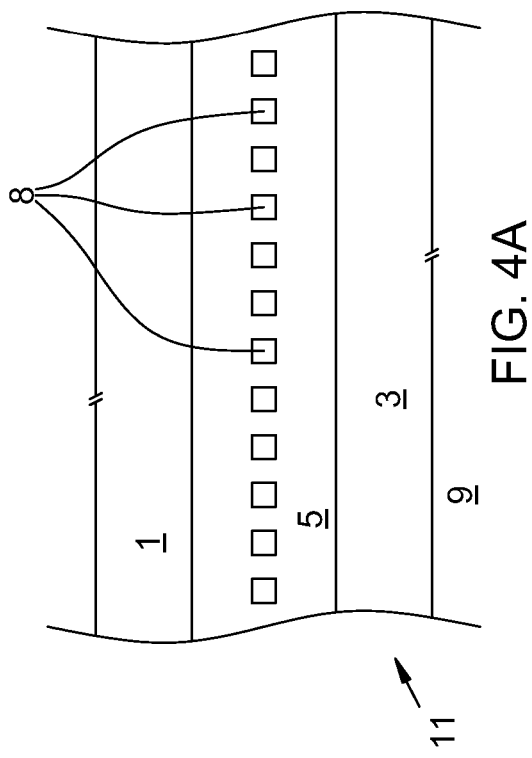
Figure 4D:
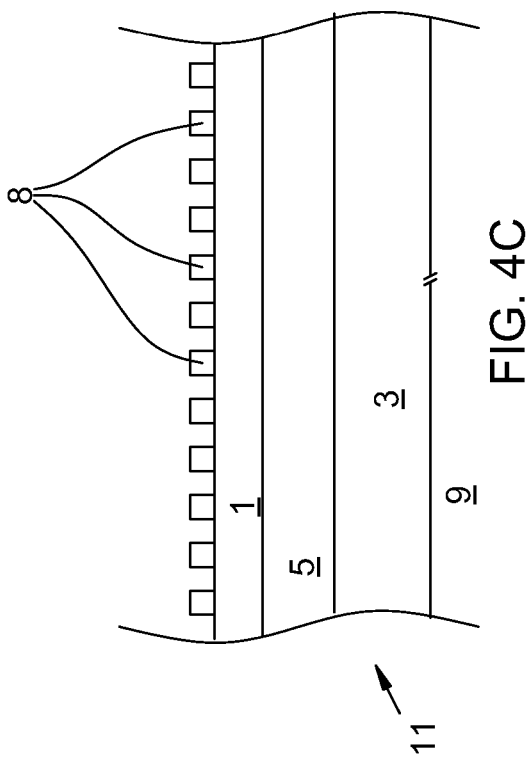

The diffractive elements may be formed in the channel waveguides in any suitable way, including but not limited to those listed hereinabove, and including but not limited to those disclosed in the incorporated references listed hereinabove. Examples are shown in FIGS. 4A–4D, which are schematic side cross-sectional views of diffractive elements in a planar waveguide 11. The planar waveguide in these embodiments is formed on a substrate 9 and comprises a core 5 surrounded by cladding 1 and 3. Diffractive elements 8 may be formed within the core (FIG. 4A), in the cladding (FIG. 4B), on the cladding (FIG. 4C), at the interface between core and cladding (FIG. 4D), or any combination of these locations. The diffractive elements 8 may comprise core material (FIG. 4B; FIG. 4D, if the diffractive elements protrude into the cladding as shown), cladding material (FIGS. 4A and 4C; FIG. 4D, if the diffractive elements extend into the core), or one or more materials differing from the core material and the cladding material (FIGS. 4A–4D).

The locking transfer functions may be determined by the particular arrangement of the elements of the corresponding locking diffractive element sets in each channel waveguide. A particular transfer function is chosen to yield the desired spectral or temporal characteristics for the optical feedback signal directed back to the laser, typically to restrict the laser optical signal to an operating wavelength range, or to otherwise optimize performance of the feedback-locked laser. For example, such a feedback-locked laser may exhibit reduced wavelength fluctuations (within operationally acceptable limits) despite modulation of its drive current. The spectral locations $\lambda_1, \lambda_2, \lambda_3, \ldots \lambda_N$ of these operating wavelength ranges may be chosen in any desired fashion. In one example, operating wavelength ranges may be selected to substantially correspond to operating wavelength channels of a wavelength-division-multiplexing (WDM) telecommunications system, such as the ITU telecommunications grid. If the set of operating wavelengths is spanned by the gain bandwidth of a single type of laser, then all of lasers 1015 may be substantially identical, with each operating wavelength determined by the corresponding locking diffractive element set.

Figures 5A, 5B, 6A, 6B:
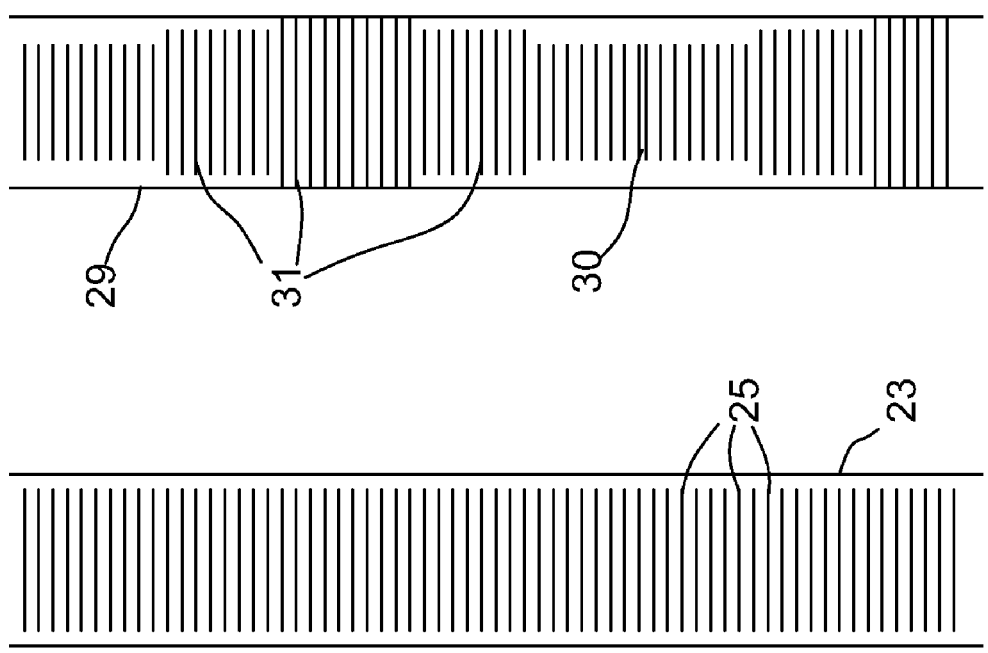
FIGS. 5A–5B are schematic top views of diffractive elements in a planar waveguide.
FIGS. 6A–6B illustrate schematically termination of a channel waveguide core in a planar waveguide.

To provide an optical feedback signal at a given vacuum wavelength $\lambda$, a periodic spacing between the diffractive elements of $m\lambda/2n_{wg}$ may be employed (where m is a non-negative integer diffractive order, and $n_{wg}$ is the effective index of the channel waveguide). An example is shown schematically in FIG. 5A, wherein substantially identical, substantially uniformly spaced diffractive elements 25 are provided along channel waveguide core 23. Desired spectral profiles of the locking transfer functions differing from that produced by a simple periodic diffractive element set may be achieved by manipulation of relative amplitude or phase (i.e. apodization) of portions of the optical signal diffracted by each element of the locking diffractive element sets, in turn achieved by proper relative arrangement of the diffractive elements in the planar waveguide. An example is shown in FIG. 5B, wherein the transverse extent of the diffractive elements 31 varies (introducing amplitude variation), and the spacing of the diffractive elements along channel waveguide core 29 varies as well (introducing phase variation, as at 30). This is described in hereinabove or disclosed in the references incorporated hereinabove. While the strongest diffraction of the optical signal occurs for a first-order set of diffractive elements (i.e. m=1), any diffractive order may be employed for providing the locking feedback optical signal. The overall reflectivity of the locking diffractive element sets may be selected to yield desired laser performance (within operationally acceptable limits), and may typically range between about 1% and about 50%. The appropriate choice of locking reflectivity depends on several variables, including laser drive current, laser power, laser cavity round-trip optical gain or loss, optical losses or spurious reflectivity between the laser and the channel waveguide, and so on.

The locking diffractive element sets may be positioned in the planar waveguide 1001 so that the optical round trip time between the back reflector of the laser and the distal end of the corresponding locking diffractive element set is less than the bit modulation period to be employed when using the lasers as data transmitters. For example, if the maximum desired data transmission rate is 2.5 Gbit/sec and the average effective index within the combined laser and channel waveguide cavity is about 1.5, then the total length (from back laser reflector to distal end of locking diffractive element set) should be less than about 4 cm, typically between a few millimeters and about 2 cm. The reflective bandwidth of the locking diffractive element set may be chosen to be on the order of the longitudinal mode spacing of the combined laser and channel waveguide cavity; smaller reflective bandwidth may result in unacceptably large laser power fluctuations as the cavity modes shift relative to the reflective bandwidth. The reflective bandwidth should be sufficiently wide to support a desired laser modulation rate or modulation bandwidth. Reflectivity of the interface between the lasers 1015 and the proximal ends of the channel waveguides may be chosen to yield desired laser performance. For example, it may be desirable to provide an anti-reflection coating (a single λ/4 layer, a λ/4 stack, or other) between the laser and the proximal end of the channel waveguide (on a laser facet, or on the proximal end face of the channel waveguide). Alternatively, it may be desirable to provide enhanced reflectivity between the laser and the channel waveguide. It may be desirable to manipulate the launch conditions between the lasers 1015 and the proximal ends of the corresponding channel waveguide cores 1003. For example, spatial mode matching may result in less optical loss, a greater fraction of the laser power being launched into the channel waveguide, and a higher level of locking feedback optical signal getting back to the laser. This may be achieved (within operationally acceptable limits) by suitable configuration, adaptation, or arrangement of the laser or the proximal end of the channel waveguide core 1003, or by additional optical components employed between the laser and channel waveguide, such as gradient or refractive lenses.

The fractions of the laser optical signals that are transmitted through the corresponding locking diffractive element sets constitute the outputs of the lasers. The transmitted fractions propagate along the corresponding channel waveguide cores 1003, exit the corresponding distal ends thereof, and enter a slab optical waveguide region 1002 of the planar waveguide 1001 (FIGS. 1–3). In this region the transmitted fractions of the laser optical signals each propagate in two dimensions and impinge on routing diffractive element sets 1027, which serve (along with distal portions of channel waveguide cores 1003, and channel waveguide core 1007) as means for routing the transmitted fractions of the laser optical signals between the corresponding laser and a corresponding output port. The transmitted fractions of the laser optical signals are successively incident on the diffractive elements of the routing diffractive element sets 1027. The multiple routing sets of diffractive elements are each arranged to route at least a portion of the transmitted fraction of the corresponding laser optical signal to a corresponding output optical port. In the exemplary embodiments of FIGS. 1–3, the distal ends of the channel waveguide cores 1003 function as the corresponding input ports of the corresponding diffractive element sets 1027. All of the routing diffractive element sets may route the corresponding optical signals to a single output port, or the routed optical signals may be routed among multiple output optical ports in any desired combination. An output optical port may comprise the end of a channel waveguide core 1007 formed on the planar waveguide 1001 (FIGS. 1 and 2), or may comprise a spatial beam size, beam shape, beam position, and beam propagation direction at an edge of the planar waveguide 1001 (designated 1008 in FIG. 3). The routed portions of the corresponding laser optical signals may enter an optical fiber 1023 positioned at the output port 1008 or at the end of channel waveguide core 1007, as the case may be. The output port(s) may be located on the same edge of the planar waveguide 1001 as the lasers 1015 (FIG. 1), may be located on an adjacent edge of planar waveguide 1001 (FIGS. 2 and 3), or may be located in any other suitable location on an edge of planar waveguide 1001. If multiple routed portions of the laser optical signals are routed to a common optical output port, then the corresponding routing diffractive element sets function as a multiplexer, and enable injection of multiple wavelength channels into a common optical fiber output.

The multiple routing diffractive element sets 1027 may comprise sets of curvilinear diffractive elements, with shapes chosen to route at least a portion of a diverging transmitted fraction of the corresponding laser optical signal to a corresponding output port, within operationally acceptable limits. The selection of suitable diffractive element shapes is described hereinabove or disclosed in the references incorporated hereinabove. The distal end of the channel waveguide cores 1003 may be tapered (FIG. 6A) or flared (FIG. 6B), as desired, to yield desired divergence of the laser optical signals in the slab waveguide region 1002. The end of a channel waveguide core 1007, if present, may be tapered or flared, as desired, to accommodate convergence of the routed laser optical signals in the slab waveguide region 1002. Within each routing diffractive element set, the diffractive elements may be arranged to yield substantially uniform phase shifts and substantially similar diffracted amplitudes, or may be arranged to yield various phase shifts and amplitudes to in turn yield a desired routing transfer function (i.e. desired apodization). The routing transfer function will typically overlap spectrally the corresponding locking transfer function imparted by the corresponding locking diffractive element set. The spacings or other arrangements of the routing diffractive elements are analogous to those already described for the locking diffractive element sets, and are described hereinabove or disclosed in the references incorporated hereinabove. The multiple routing diffractive element sets may be longitudinally displaced relative to one another (i.e. "stacked") and therefore occupy separate areal portions of the slab waveguide region 1002 of the planar waveguide 1001. Or, the multiple routing diffractive element sets may occupy overlapping areal portions of the slab waveguide region 1002 of planar waveguide 1001. Such overlapping sets of diffractive elements may be overlaid or interleaved as disclosed in the references incorporated hereinabove.

It is typically intended that the fraction of the laser optical signal transmitted by the corresponding locking diffractive element set is diffracted only by the corresponding routing diffractive element set (and a portion thereof thereby routed to the corresponding output port). In this way multiple laser optical signals at multiple corresponding, differing wavelengths from multiple corresponding lasers may be routed to the corresponding output ports, or to a single output port, by diffraction from the corresponding routing diffractive element sets, even if the optical signals must propagate through other routing diffractive element sets.

An exemplary use of a multiple-wavelength optical source, such as the exemplary embodiments of FIGS. 1–3, may be transmission of multiple wavelength-differentiated data channels into a single output port or into a single output optical fiber. Another exemplary use is switching of a single data channel among multiple carrier wavelengths, by electronic switching of an electronic modulation signal among the various lasers of the multiple-wavelength source. These uses or other uses of the multiple-wavelength optical sources shall fall within the scope of the present disclosure or appended claims.

Since the locking diffractive element sets and the corresponding routing diffractive element sets are all formed on the same planar optical waveguide, it may be possible to form them in a single lithographic step or sequence. For example, all of the locking and routing diffractive elements may be defined on a common mask used to form the diffractive elements on the planar waveguide. The spectral characteristics of each locking diffractive element set and its corresponding routing diffractive element set, as well as the relative wavelength offsets of the various locking diffractive element sets (e.g. to match a corresponding wavelength channel spacing of a WDM system), may be very precisely set during the fabrication of such a mask. Once formed, any shifting of spectral characteristics of the various diffractive element sets due to environmental influences (such as temperature-induced wavelength shifts due to thermo-optic effects or thermal expansion of the planar waveguide) are well-correlated with one another, since all are formed on a common planar waveguide. If precise control of the absolute wavelengths is desired, a single temperature control mechanism may be employed for temperature stabilizing the planar waveguide, and all the diffractive element sets thereon. Such temperature control may be achieved by any suitable means, including any suitable temperature sensor, heat source, or feedback circuit, or other mechanism. The multiple-wavelength optical source may then be temperature-tuned to the desired wavelengths, or may be stabilized at a desired temperature or operating wavelengths.

Figure 7:
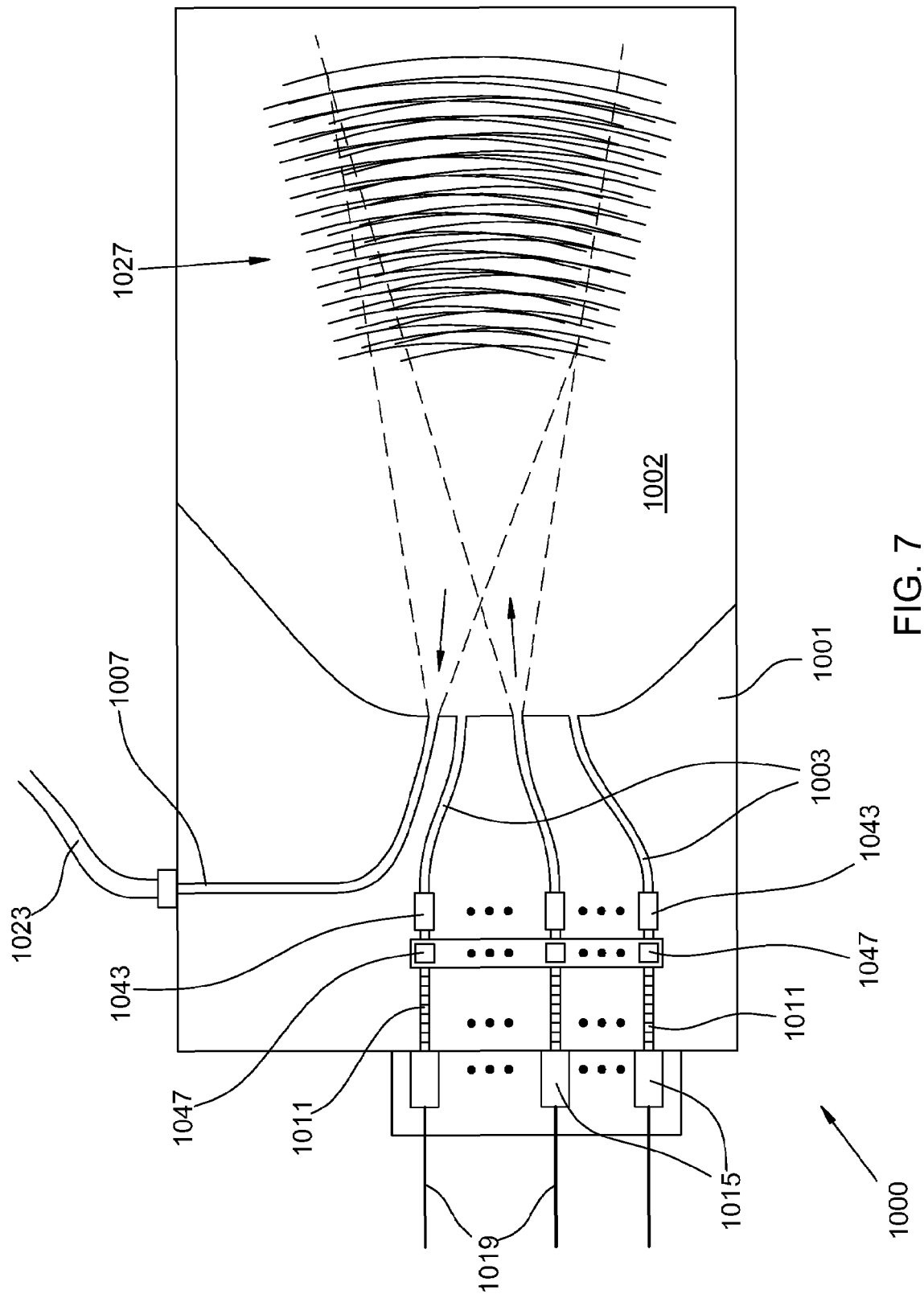
FIG. 7 illustrates schematically a planar waveguide with multiple locking diffractive element sets and multiple routing diffractive element sets, multiple photodetectors, multiple variable optical attenuators, and multiple lasers.
Figure 8:
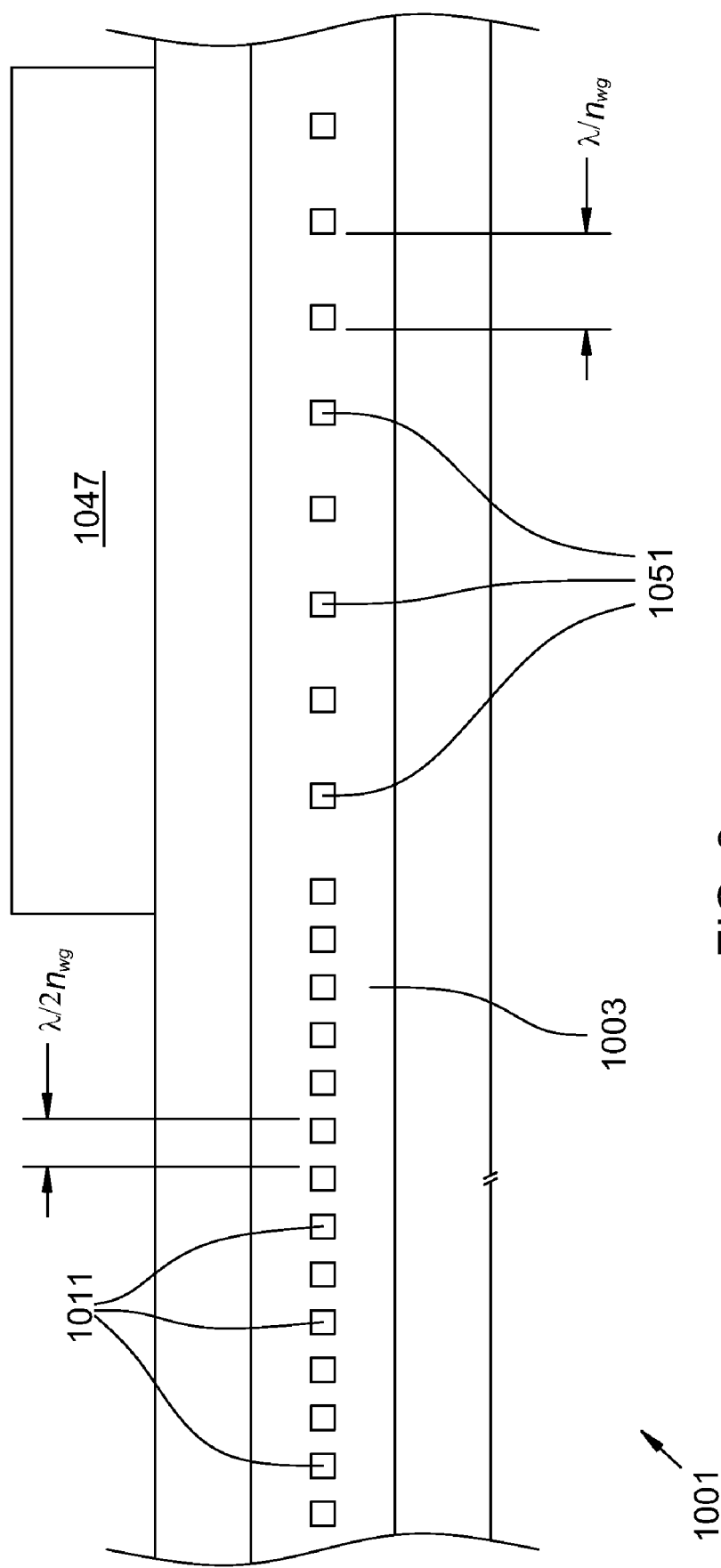
FIG. 8 is a schematic cross-section of diffractive elements in a planar waveguide.

In the exemplary embodiment of FIG. 7, each locking diffractive element set 1011 includes at least a section of higher-order diffractive elements 1051 (not visible in FIG. 7; shown in the schematic cross-section of FIG. 8), for redirecting a portion of the corresponding laser optical signal out of the planar waveguide. While the redirected portion of the optical signal represents optical loss during propagation along the channel waveguide, this redirected signal portion may be useful for monitoring the optical power level propagating along the channel waveguide. Photodetectors 1047 may be positioned above the higher-order section of diffractive elements 1051 for receiving the redirected portion of the optical signal. While any higher-order diffractive element set (i.e., higher than first order) will redirect a portion of the optical signal out of the planar waveguide, even-order diffractive element sets redirect at least one portion vertically from the planar waveguide, which may then be more efficiently collected by the photodetector. In the exemplary embodiment of FIG. 8, most of the locking diffractive element set 1011 is first-order (element spacing of $\lambda/2n_{wg}$), and the higher-order section 1051 is second-order (element spacing of $\lambda/n_{wg}$).

Photodetectors 1047 may be assembled individually onto the planar waveguide 1001 over the corresponding higher-order sections 1051 of the diffractive element sets 1011, or the photodetectors may comprise an integrated photodetector array assembled onto the planar waveguide 1001. Alternatively, photodetectors 1047 may be integrated directly into the planar waveguide 1001, above or below the higher-order section of diffractive elements. The signals generated by the photodetectors 1047 may be used to measure the optical signal power propagating through the channel waveguides for monitoring, diagnostics, trimming, signal normalization, feedback control, or for other purposes. For example, the planar waveguide may further comprise multiple corresponding variable optical attenuators 1043 for controlling the optical power level propagating through the segments of the corresponding channel waveguides distal to the attenuators. The attenuators 1043 may be operatively coupled to the corresponding photodetectors 1047 through a feedback circuit for maintaining the laser optical signal level reaching the corresponding routing diffractive element sets 1027 within a selected operating range. Alternatively, the signals generated by the photodetectors 1047 may be used as a feedback signal for controlling the laser drive current to the corresponding lasers 1015. These and any other suitable feedback mechanisms shall fall within the scope of the present disclosure or appended claims. Higher-order diffractive elements (for redirecting portions of the laser optical signals) or photodetectors may be positioned elsewhere besides the locking diffractive element sets. For example, the routing diffractive element sets may include higher-order sections, or other portions of channel waveguide cores 1003 or 1007 (instead of segments thereof having the locking diffractive element sets) may be provided with a higher-order set of diffractive elements for redirecting portions of the laser optical signals onto photodetectors. Any suitable location for positioning higher-order diffractive elements for redirecting portions of the laser optical signals to corresponding photodetectors shall fall within the scope of the present disclosure or appended claims.

Figure 9:
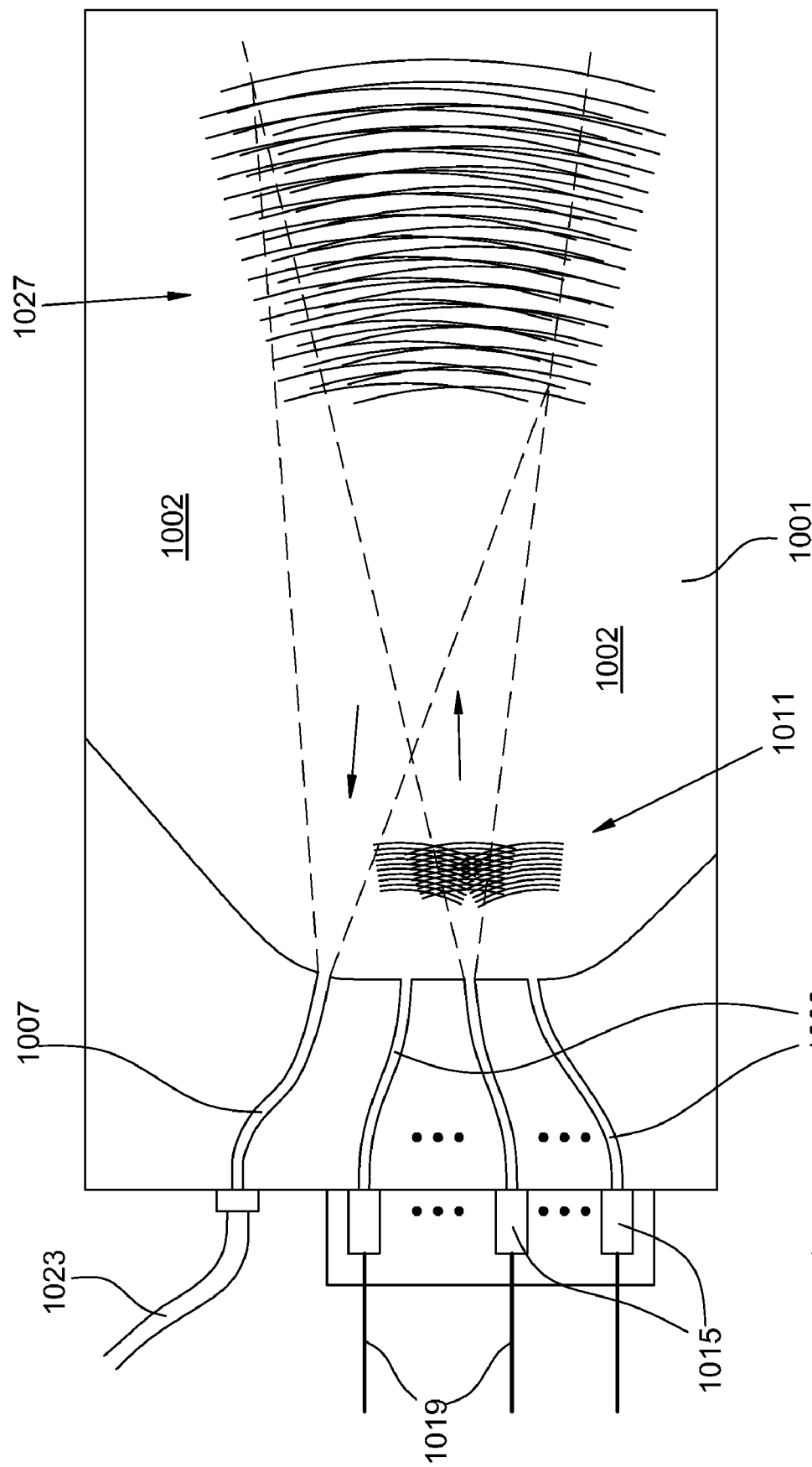
FIG. 9 illustrates schematically a planar waveguide with multiple locking diffractive element sets and multiple routing diffractive element sets, and multiple lasers.

In the exemplary embodiment illustrated schematically in FIG. 9, the locking diffractive element sets 1011 comprise curvilinear diffractive elements formed in the slab optical waveguide region 1002. The laser optical signals emerge from the distal ends of channel waveguide cores 1003, propagate in two dimensions through slab waveguide region 1002, and are successively incident on the locking diffractive elements of the corresponding sets 1011. The schematic cross-sectional views of FIGS. 4A–4D may represent curvilinear locking diffractive elements sets 1011. The curvilinear diffractive elements are shaped to redirect a fraction of the laser optical signal back to the laser with a locking transfer function, in a manner analogous to that described hereinabove for locking diffractive element sets formed in channel waveguides. Suitable curvilinear shapes may be determined in a manner analogous to those used for determining the curvilinear shapes of the routing diffractive element sets, as described hereinabove or disclosed in the references incorporated hereinabove. The fractions of the corresponding laser optical signals transmitted by the corresponding locking diffractive element sets are successively incident on the elements of the corresponding routing diffractive element sets 1027, which route portions of the corresponding laser optical signals to corresponding output port(s). The channel waveguide cores 1003 may be omitted completely, with the lasers 1015 launching the corresponding laser optical signals directly into slab waveguide region 1002. The curvilinear locking diffractive elements sets may include higher-order sections thereof, for directing a portion of the corresponding laser optical signals out of the planar waveguide, and corresponding photodetectors may be positioned for receiving these corresponding redirected portions. The curvilinear locking diffractive element sets may be stacked, overlaid, or interleaved in a manner analogous to that described hereinabove for the routing diffractive element set, or disclosed in the references incorporated hereinabove.

Figure 10:
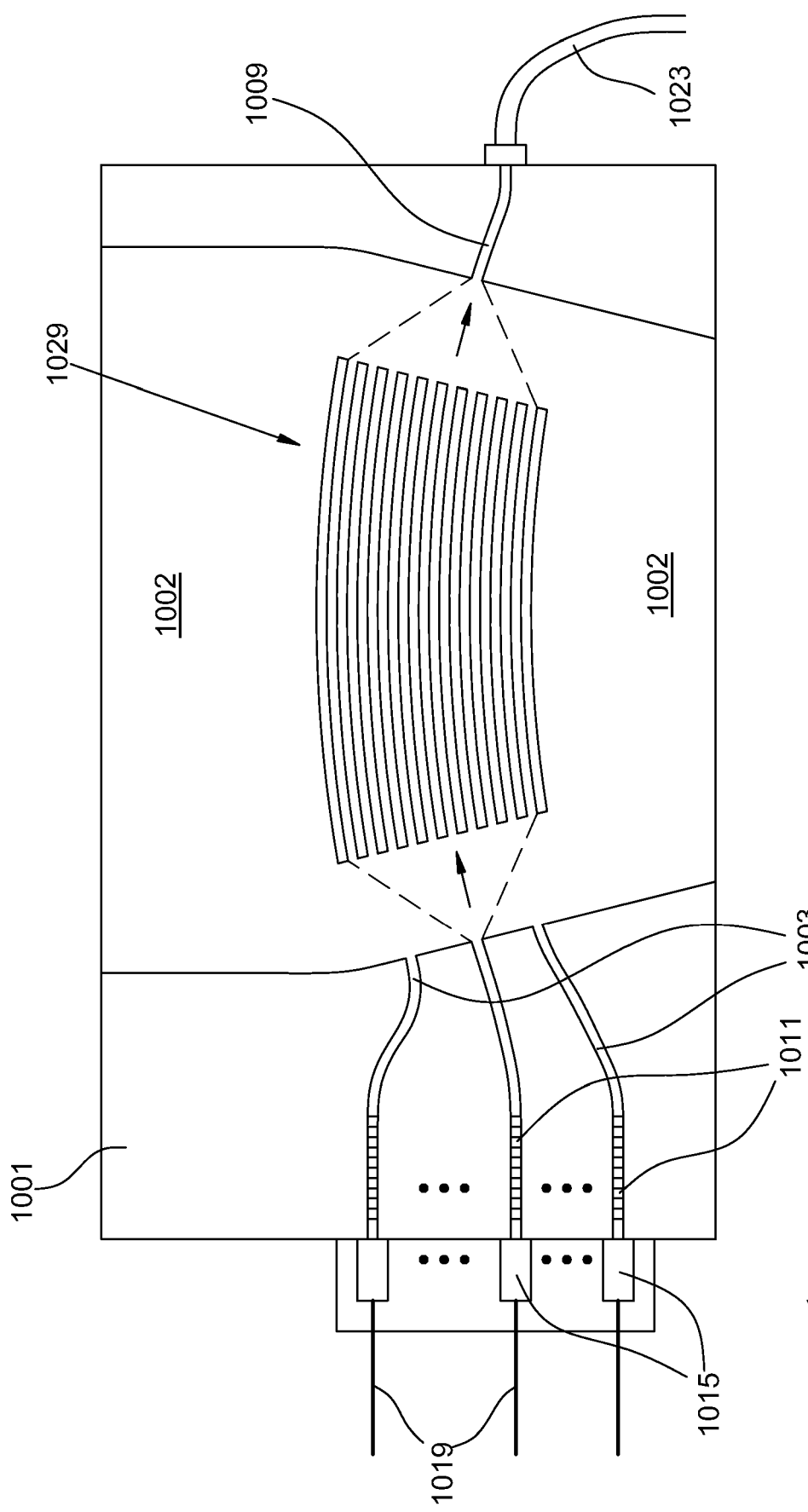
FIG. 10 illustrates schematically a planar waveguide with multiple locking diffractive element sets and an arrayed-waveguide grating, and multiple lasers.

In the exemplary embodiment of FIG. 10, the routing means for routing the laser optical signals from the corresponding lasers 1015 to the corresponding output port (channel waveguide 1009 in this example) comprises an arrayed-waveguide grating 1029 formed on planar waveguide 1001 (along with distal portions of channel waveguide cores 1003, and channel waveguide core 1009). Locking diffractive element sets 1011 formed along corresponding channel waveguide cores 1003 provide corresponding locking feedback signals to the corresponding lasers 1015. The arrayed-waveguide grating (AWG; also referred to as a phased array or phased waveguide array) may be implemented in a variety of ways known in the art, so that the fractions of the corresponding laser optical signals transmitted by the corresponding locking diffractive element sets 1011 and propagating along corresponding channel waveguide cores 1003 are routed to corresponding output port(s). Various other aspects of the multiple-wavelength optical source may be modified as already described herein: lasers 1015 may comprise individual lasers assembled with the planar waveguide, an integrated array of lasers assembled with the planar waveguide, or lasers integrated into the planar waveguide; locking diffractive element sets 1011 may include corresponding higher-order sections for redirecting portions of the corresponding laser optical signals out of the planar waveguide 1001; other portions of channel waveguide cores 1003, waveguide core 1009, or the AWG 1029 may include corresponding higher-order sections for redirecting portions of the corresponding laser optical signals out of the planar waveguide 1001; corresponding photodetectors may receive redirected portions of the corresponding optical signals; photodetectors may comprise individual photodetectors assembled with the planar waveguide, an integrated array of photodetectors assembled with the planar waveguide, or photodetectors integrated into the planar waveguide; photodetector signals may provide feedback control of laser optical signal power; the multiple laser optical signals may be directed to one or more output optical ports; or laser optical signals directed to output ports may enter corresponding optical fibers.

A wide variety of materials may be employed for forming the planar waveguide and the locking diffractive element sets, channel waveguides, slab waveguide, routing diffractive element sets, arrayed-waveguide gratings, or other elements of a multiple-wavelength optical source, and any suitable material or combination of materials shall fall within the scope of the present disclosure or appended claims. A common material combination is a silicon substrate with silica cladding (doped or undoped as appropriate) and with doped silica or silicon nitride or silicon oxynitride waveguide cores. If lasers or photodetectors are to be integrated into the planar waveguide, suitable materials must be chosen for the planar waveguide that are compatible with laser or photodetector materials at the operating wavelengths of the device. For typical telecommunications wavelengths, these will typically include III-V semiconductors or various alloys thereof.

Whether integrated into the planar waveguide, or assembled with the planar waveguide as an integrated array, lasers or photodetectors are subject to yield limitations in their manufacture. So that a single sub-standard laser or photodetector does not result in rejection of an entire array, arrays may be constructed with extra lasers or photodetectors. The planar waveguide may be fabricated with extra locking diffractive element sets and extra routing means to accommodate these extra lasers or photodetectors. In this way, if a laser or photodetector of an array is bad, the array may still be used. The corresponding electronic channels are simply switched on or off accordingly, to only use channels having a good laser or a good photodetector.

In the present disclosure or appended claims, the conjunction "or" is to be construed inclusively (e.g., "a dog or a cat" would be interpreted as "a dog, or a cat, or both"; Bryan A. Garner, *Elements of Legal Style* p. 103, 2nd ed. 2002), unless: i) it is explicitly stated otherwise, e.g., by use of "either-or", "only one of", or similar language; or ii) two or more of the listed alternatives are mutually exclusive within the specific context, in which case "or" would encompass only those combinations involving non-mutually-exclusive alternatives, if any.

It should be noted that many of the embodiments depicted in this disclosure are only shown schematically, and that not all the features may be shown in full detail or in proper proportion or location. Certain features or structures may be exaggerated relative to others for clarity. In particular, it should be noted that the numbers of diffractive elements in an actual device may typically be larger than that shown in the Figures. The numbers of diffractive elements is reduced in the Figures for clarity. It should be further noted that the embodiments shown in the Figures are exemplary only, and should not be construed as specifically limiting the scope of the written description or the claims set forth herein. It is intended that equivalents of the disclosed exemplary embodiments or methods shall fall within the scope of the present disclosure. It is intended that the disclosed exemplary embodiments or methods, or equivalents thereof, may be modified while remaining within the scope of the present disclosure or appended claims.

What is claimed is:

1. A method for forming an optical apparatus, comprising:
    forming a planar optical waveguide substantially confining in at least one transverse spatial dimension optical signals propagating therein;
    forming at least one set of locking diffractive elements in or on the planar optical waveguide;
    forming means for routing an optical signal corresponding to at least one said set of locking diffractive elements; and
    positioning a laser corresponding to at least one said set of locking diffractive elements so as to launch a corresponding laser optical signal into the planar optical waveguide so that the corresponding laser optical signal is successively incident on the diffractive elements of the corresponding locking diffractive element set,
    wherein:
    each locking diffractive element set routes within the planar optical waveguide a fraction of the corresponding laser optical signal back to the corresponding laser, with a corresponding locking transfer function, as a corresponding locking optical feedback signal, thereby substantially restricting the corresponding laser optical signal to a corresponding laser operating wavelength range determined at least in part by the corresponding locking transfer function of the corresponding locking diffractive element set; and
    each corresponding routing means routes within the planar optical waveguide, between the corresponding laser and a corresponding output optical port with a corresponding routing transfer function, at least a portion of that fraction of the corresponding laser optical signal that is transmitted by the corresponding locking diffractive element set.

2. The method of claim 1, further comprising forming multiple sets of locking diffractive element sets and multiple corresponding routing means, and positioning multiple corresponding lasers so as to launch corresponding laser optical signals into the planar optical waveguide so that the corresponding laser optical signals are successively incident on the diffractive elements of the corresponding locking diffractive element sets.

3. The method of claim 2, wherein the multiple lasers comprise a set of individual lasers each assembled with the planar optical waveguide.

4. The method of claim 2, wherein the multiple lasers comprise an integrated laser array assembled with the planar optical waveguide.

5. The method of claim 2, wherein the multiple lasers are integrated into the planar optical waveguide.

6. The method of claim 5, wherein the planar optical waveguide and the multiple lasers integrated therein comprise semiconductor materials.

7. The method of claim 2, further comprising positioning multiple corresponding monitor photodetectors for receiving portions of the corresponding laser optical signals that propagate out of the planar optical waveguide.

8. The method of claim 7, wherein each locking diffractive element set comprises a corresponding higher-order set of diffractive elements for redirecting a portion of the corresponding laser optical signal to propagate out of the planar optical waveguide and impinge on the corresponding monitor photodetector.

9. The method of claim 7, wherein each routing means comprises a corresponding higher-order set of diffractive elements for redirecting a portion of the corresponding laser optical signal to propagate out of the planar optical waveguide and impinge on the corresponding monitor photodetector.

10. The method of claim 7, further comprising operatively coupling multiple corresponding feedback mechanisms to the corresponding monitor photodetectors for controlling power of the corresponding laser optical signals transmitted by the corresponding locking diffractive element sets.

11. The method of claim 2, further comprising forming multiple corresponding channel optical waveguides in the planar optical waveguide and positioning said corresponding channel waveguides for receiving the corresponding laser optical signals launched from the corresponding lasers into the planar optical waveguide, wherein the corresponding locking diffractive element sets route within the corresponding channel optical waveguides the corresponding fractions of the corresponding laser optical signals back to the corresponding lasers.

12. The method of claim 11, further comprising forming the corresponding channel optical waveguides with tapered or flared end segments for delivering to the corresponding routing means the portions of the corresponding laser optical signals transmitted by the corresponding locking diffractive element sets.

13. The method of claim 2, further comprising forming a slab waveguide region in the planar optical waveguide and positioning said slab waveguide region for receiving the corresponding laser optical signals launched from the corresponding lasers into the planar optical waveguide, wherein the corresponding locking diffractive element sets route within the slab waveguide region the corresponding fractions of the corresponding laser optical signals back to the corresponding lasers.

14. The method of claim 13, further comprising overlaying the corresponding locking diffractive element sets.

15. The method of claim 13, further comprising displacing longitudinally the corresponding locking diffractive element sets relative to one another.

16. The method of claim 13, further comprising interleaving the corresponding locking diffractive element sets.

17. The method of claim 13, further comprising forming the diffractive elements of the multiple locking diffractive sets so as to comprise curvilinear diffractive elements.

18. The method of claim 2, wherein the corresponding laser operating wavelength ranges substantially correspond to operating wavelength channels of a WDM telecommunications system.

19. The method of claim 2, further comprising forming the planar optical waveguide so as to comprise a core and cladding, and forming the diffractive elements of the multiple locking diffractive element sets in the core, in the cladding, on the cladding, or at an interface between the core and the cladding.

20. The method of claim 2, further comprising forming the multiple corresponding routing means:
so as to comprise multiple corresponding routing diffractive element sets formed in a slab optical waveguide region of the planar optical waveguide; and
so that the corresponding fractions of the corresponding laser optical signals transmitted by the corresponding locking diffractive element sets are successively incident on the diffractive elements of the corresponding routing diffractive element sets.

21. The method of claim 20, further comprising overlaying the corresponding routing diffractive element sets.

22. The method of claim 20, further comprising displacing longitudinally the corresponding routing diffractive element sets relative to one another.

23. The method of claim 20, further comprising interleaving the corresponding routing diffractive element sets.

24. The method of claim 20, further comprising forming the corresponding routing diffractive element sets so that the corresponding portions of the multiple corresponding laser optical signals transmitted by the corresponding locking diffractive element sets are routed by the corresponding routing diffractive element sets to a common output optical port.

25. The method of claim 20, further comprising positioning at least one optical fiber for receiving from the planar optical waveguide the corresponding portions of the multiple corresponding laser optical signals transmitted by the corresponding locking diffractive element sets and routed by the corresponding routing diffractive element sets to the corresponding output optical ports.

26. The method of claim 20, further comprising forming the diffractive elements of the multiple routing diffractive sets so as to comprise curvilinear diffractive elements.

27. The method of claim 20, further comprising forming the planar optical waveguide so as to comprise a core and cladding, and forming the diffractive elements of the multiple routing diffractive element sets in the core, in the cladding, on the cladding, or at an interface between the core and the cladding.

28. The method of claim 2, further comprising forming the multiple corresponding routing means so as to comprise an arrayed waveguide grating in the planar optical waveguide.

29. The method of claim 28, further comprising forming the arrayed waveguide grating so as to route the corresponding portions of the multiple corresponding laser optical signals transmitted by the corresponding locking diffractive element sets to a common output optical port.

30. The method of claim 28, further comprising positioning at least one optical fiber for receiving from the planar optical waveguide the corresponding portions of the multiple corresponding laser optical signals transmitted by the corresponding locking diffractive element sets and routed by the arrayed waveguide grating to the corresponding output optical ports.

31. The method of claim 2, further comprising operatively coupling a temperature controller to the planar optical waveguide for maintaining the planar optical waveguide substantially within an operating temperature range.

* * * * *